U. WEDGE.
TREATING FURNACE GASES.
APPLICATION FILED MAR. 15, 1912.
1,046,915.
Patented Dec. 10, 1912.
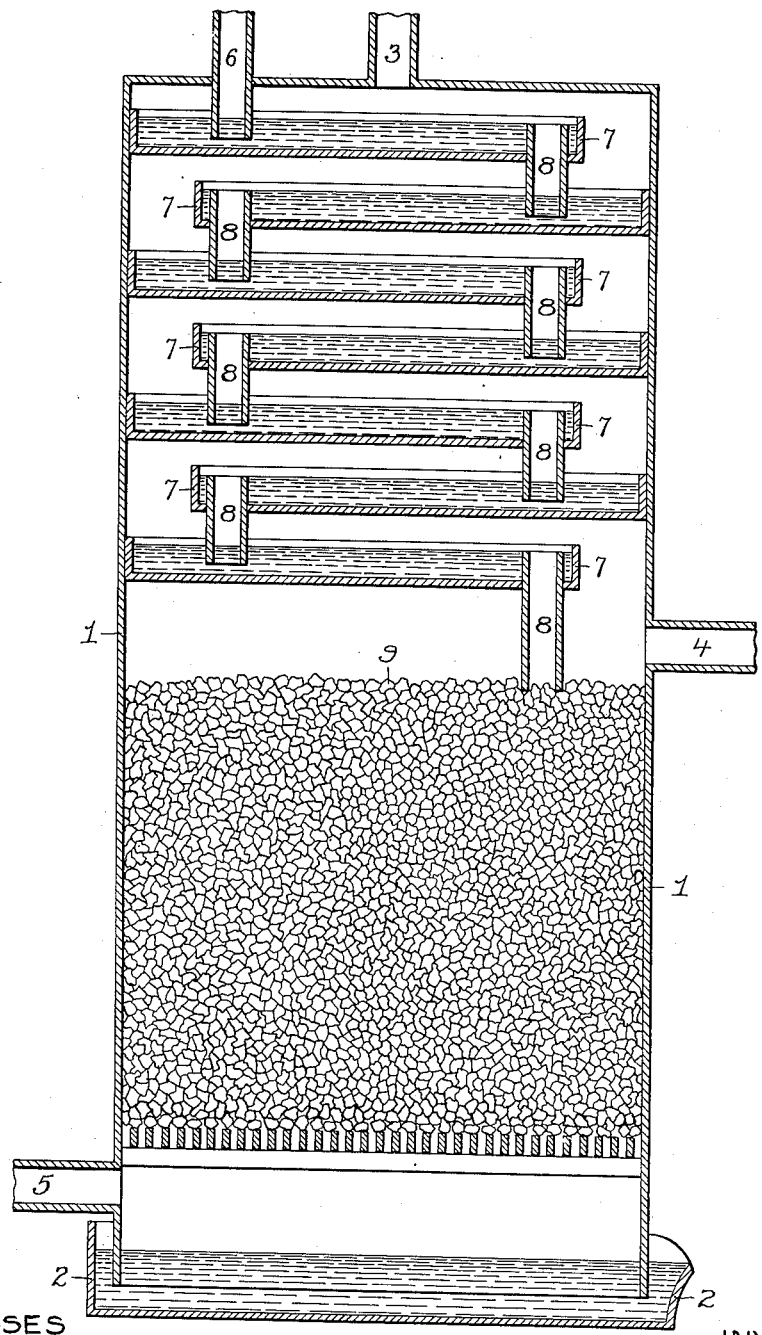
WITNESSES
E. Fullerton
Hamilton S. Turner
INVENTOR
UTLEY WEDGE
BY HIS ATTORNEY
Harry Smith

UNITED STATES PATENT OFFICE.

UTLEY WEDGE, OF ARDMORE, PENNSYLVANIA.

TREATING FURNACE-GASES.

1,046,915.  Specification of Letters Patent.  Patented Dec. 10, 1912.

Application filed March 15, 1912. Serial No. 684,060.

*To all whom it may concern:*

Be it known that I, UTLEY WEDGE, a citizen of the United States, residing at Ardmore, Pennsylvania, have invented certain Improvements in Treating Furnace-Gases, of which the following is a specification.

The object of my invention is to increase the percentage of sulfur dioxid in gases from furnaces or converters for smelting pyrites, sulfid ores, copper matte and the like, the enriched gases being thereby rendered available for effective subsequent use as for instance in the manufacture of sulfuric or sulfurous acid or brimstone.

The figure in the accompanying drawing illustrates a vertical sectional view of one form of apparatus which may be employed in carrying out my invention.

Gases issuing from furnaces of the character before referred to seldom contain a percentage of sulfur dioxid high enough to warrant their use in the manufacture of sulfuric acid either by the chamber process or the contact process. For the economical working of either of these the proportion of sulfur dioxid should be fairly uniform and as high as practicable, preferably not below six per cent. of the volume of gas. The furnace gases, however, usually contain a much lower percentage of sulfur dioxid than the above noted minimum, which percentage is likely to be variable, with the result that if the gases as issuing from the furnace are utilized as for example in the production of sulfuric acid, the percentage of acid derived from a given quantity of gas or a given chamber space will be small and the cost of manufacture high and the low percentage of sulfur dioxid contained in some of the furnace gases will necessitate the use of lead chambers or other gas utilization apparatus of such enormous dimensions as to be impracticable.

In carrying out my invention, therefore, I so treat the furnace gases as to very materially increase the percentage of sulfur dioxid in the gases employed in the acid producing apparatus or other apparatus for recovering sulfur values, and I am therefore enabled to greatly increase the quantity of product secured from a unit of given size, and, when the chamber process is employed, I am enabled to restrict the dimensions of the chambers within the bounds of practicability.

The capacity of water to absorb the sulfur dioxid contained in furnace gases at a given pressure depends upon the temperature of the water and its condition. Water at a temperature of 60° F., has a theoretical capacity to absorb almost 10 per cent. of its weight of sulfur dioxid, its absorbing capacity increasing with a rise in pressure and decreasing with a rise in temperature until, when the temperature approaches the boiling point, its capacity to absorb sulfur dioxid is destroyed.

The above noted capacity of water to absorb sulfur dioxid is predicated upon a quiescent or relatively quiescent condition of the water, agitation of the water restricting or preventing its absorption of the gas or causing the gas to be freed from it if it has been previously absorbed.

In carrying out my present invention, therefore, I cause the furnace gas containing a low percentage of sulfur dioxid to pass in contact with a body or bodies of water in a relatively quiescent state and at a relatively low temperature, so that it will absorb the sulfur dioxid and then agitate the water, and in some cases also increase its temperature so as to drive off the sulfur dioxid therefrom.

In the drawing, 1 represents a tower of any appropriate material, luted or sealed at the bottom by water or other suitable liquid contained in a pan 2. The lute may be of any depth required and when pressure is used the pan may be united with the walls or curtains of the tower and suitable pressure retaining devices may be provided at all inlets and outlets for liquid and also at the gas outlets. Pipes for the flow of gas communicate with the tower at the top, at an intermediate point and at a point close to the bottom, the top pipe being indicated at 3, the intermediate pipe at 4, and the bottom pipe at 5.

At the top of the tower is also a water supply pipe 6, and within the upper portion of the tower are a series of superposed pans or trays 7 disposed as shown so as to cause the gas in its passage through the upper portion of the tower to follow a serpentine course. The water pipe 6 discharges into the uppermost tray 7 and the water overflowing from each tray is carried to the tray below by means of a connecting pipe 8 which preferably terminates below the level of water in the lower tray so as to cause minimum agitation of the water flowing from tray to tray.

The pipe 8 of the lowermost tray 7 discharges into a mass 9 of broken brick, stone, or other material with which the lower portion of the tower 1 is filled and which will serve to break up the stream of water flowing through the tower or cause agitation of the same, although in carrying out my invention this particular method of causing agitation of the water is not essential, and any other available means may be adopted in place of the same.

Supposing that water at a temperature of say 60° F., is supplied to the uppermost tray 7 and that the hot furnace gases containing as low as three per cent. of sulfur dioxid enter the lower portion of the tower through the pipe 5, the action will be as follows: As the gases ascend through the material 9 in the lower portion of the tower there is a relatively slight absorption of sulfur dioxid owing to the fact that said water is in a state of constant agitation and (in case the gases entering the tower are hot) is at a relatively high temperature because of its contact with the hot gases but as the gases pass in a serpentine course over the surface of the gently moving bodies of water lying in the trays 7 in the upper portion of the tower the sulfur dioxid will be absorbed in greater and greater quantity by said bodies of water owing to the gradually decreasing temperature of the same in the successive trays and the gases will finally escape at the outlet 3 with little or no sulfur dioxid contained therein, depending upon the proportions of the apparatus used relative to the work to be accomplished.

In case the gases entering the tower have not sufficient heat, additional heat may be supplied in the lower portion of the tower by the use of steam or other suitable means. In any event the warm or hot zone may be kept toward the bottom of the tower by the constantly descending water.

As the water containing the sulfur dioxid in solution passes from the lowermost tray 7 into and through the material 9 in the lower portion of the tower the sulfur dioxid will be freed therefrom to a very large extent by reason of the agitation to which the water is subjected and by reason of the relatively high temperature acquired by the water in its passage, consequently any gas withdrawn from the intermediate portion of the tower through the pipe 4 will contain a much higher percentage of sulfur dioxid than the gas entering the tower through the pipe 5. It is preferable to maintain the gases under pressure during their passage through the tower 1, the gases being forced into the tower under pressure and this pressure being maintained as before described.

In some cases I may reverse the flow of gases through the tower, admitting them at the top and removing them from the bottom, and where it is not desired to use both heat and agitation as a means of causing the water to give up the sulfur dioxid contained therein the gas exit pipe 4 may be omitted and the water permitted to escape from the lowest tray of the series into a separate vessel in which it is maintained in a state of agitation, the enriched gases being withdrawn from the top of said vessel and the water from the lower portion of the same, or, on the other hand, heat alone may be relied upon to free the sulfur dioxid from the water, by continuing the series of trays to the bottom of the tower.

I claim:

1. The mode herein described of increasing the percentage of sulfur dioxid in furnace gases, said mode comprising the flowing of said gases in contact with a relatively quiescent body of water in order to effect absorption of sulfur dioxid by the latter, then subjecting the water to agitation in order to separate therefrom sulfur dioxid previously absorbed thereby, and withdrawing gases at a point where their original sulfur dioxid content has been reinforced by the liberation from the water of sulfur dioxid previously absorbed thereby.

2. The mode herein described of increasing the percentage of sulfur dioxid in furnace gases, said mode comprising the flowing of said gases in contact with a relatively quiescent body of water in order to effect absorption of sulfur dioxid by the latter, then subjecting said water to heat sufficient to separate therefrom sulfur dioxid previously absorbed thereby and withdrawing gases at a point where their original sulfur dioxid content has been reinforced by the liberation from the water of sulfur dioxid previously absorbed thereby.

3. The mode herein described of increasing the percentage of sulfur dioxid in furnace gases, said mode comprising the flowing of said gases in contact with a relatively quiescent body of water in order to effect absorption of sulfur dioxid by the latter, then subjecting said water to agitation and heat sufficient to separate therefrom sulfur dioxid previously absorbed thereby, and withdrawing gases at a point at which their original sulfur dioxid content has been reinforced by the liberation from the water of sulfur dioxid previously absorbed thereby.

4. The mode herein described of increasing the percentage of sulfur dioxid in furnace gases, said mode comprising the flowing of said gases, while under pressure, in contact with a relatively quiescent body of water in order to effect absorption of sulfur dioxid by the latter, then subjecting said water to agitation in order to separate therefrom sulfur dioxid previously absorbed thereby, and withdrawing gases at a point where their original sulfur dioxid content has been reinforced by the liberation from the water of sulfur dioxid previously absorbed thereby.

5. The mode herein described of increasing the percentage of sulfur dioxid in furnace gases, said mode comprising the flowing of said gases, while under pressure, in contact with a relatively quiescent body of water in order to effect absorption of sulfur dioxid by the latter, then subjecting said water to heat sufficient to separate therefrom sulfur dioxid previously absorbed thereby, and withdrawing gases at a point at which their original sulfur dioxid content has been reinforced by the liberation from the water of sulfur dioxid previously absorbed thereby.

6. The mode herein described of increasing the percentage of sulfur dioxid in furnace gases, said mode comprising the flowing of said gases, while under pressure, in contact with a relatively quiescent body of water in order to effect absorption of sulfur dioxid by the latter, then subjecting said water to agitation and heat sufficient to separate therefrom sulfur dioxid previously absorbed thereby, and removing gases at a point where their original sulfur dioxid content has been reinforced by the liberation from the water of sulfur dioxid previously absorbed thereby.

In testimony whereof, I have signed my name to this specification, in the presence of two subscribing witnesses.

UTLEY WEDGE.

Witnesses:
KATE A. BEADLE,
HAMILTON D. TURNER.